(12) United States Patent
Kare et al.

(10) Patent No.: US 12,210,520 B2
(45) Date of Patent: Jan. 28, 2025

(54) SEARCHABLE DATA PROCESSING OPERATION DOCUMENTATION ASSOCIATED WITH DATA PROCESSING OF RAW DATA

(71) Applicant: Capital One Services, LLC, McLean, VA (US)

(72) Inventors: Sarvani Kare, Clarksville, MD (US); James Harris, McLean, VA (US); Zabihullah Tora, Chantilly, VA (US); Andrew Stevens, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/449,145

(22) Filed: Sep. 28, 2021

(65) Prior Publication Data

US 2023/0100289 A1    Mar. 30, 2023

(51) Int. Cl.
| | |
|---|---|
| *G06F 16/242* | (2019.01) |
| *G06F 16/11* | (2019.01) |
| *G06F 16/23* | (2019.01) |
| *G06F 16/25* | (2019.01) |
| *G06F 40/205* | (2020.01) |

(52) U.S. Cl.
CPC ........ *G06F 16/2443* (2019.01); *G06F 16/125* (2019.01); *G06F 16/2365* (2019.01); *G06F 16/252* (2019.01); *G06F 16/258* (2019.01); *G06F 40/205* (2020.01)

(58) Field of Classification Search
CPC .. G06F 16/2443; G06F 16/125; G06F 16/258; G06F 16/2365; G06F 16/252; G06F 40/205
USPC ........................................................ 707/702
See application file for complete search history.

(56) References Cited

U.S. PATENT DOCUMENTS

| | | | |
|---|---|---|---|
| 11,526,524 B1* | 12/2022 | Saulys | G06F 8/34 |
| 2021/0209099 A1* | 7/2021 | Marsden | G06F 16/2465 |
| 2021/0342725 A1* | 11/2021 | Marsden | G06F 18/217 |
| 2022/0058193 A1* | 2/2022 | Smith | G06F 16/2465 |
| 2022/0067054 A1* | 3/2022 | Saha | G06F 9/541 |
| 2022/0237565 A1* | 7/2022 | Dzierzanowski | G06Q 10/103 |
| 2022/0292106 A1* | 9/2022 | Umay | G06F 16/196 |

* cited by examiner

*Primary Examiner* — Giovanna B Colan
(74) *Attorney, Agent, or Firm* — Harrity & Harrity, LLP

(57) ABSTRACT

In some implementations, a device may store a set of data in a first database associated with a fixed storage duration and a storage parameter that restricts access associated with adding or modifying information stored in the first database. The device may process a subset of data from the set of data, wherein processing the subset of data includes performing one or more data processing operations performed via data processing operation documentation that defines the one or more data processing operations. The device may store the data processing operation documentation in a second database associated with a variable storage duration for data stored in the second database. The device may provide the first database and the second database as data sources for a data searching application to enable the first database and the second database to be searchable via a dashboard associated with the data searching application.

19 Claims, 6 Drawing Sheets

SEARCHABLE DATA PROCESSING OPERATION DOCUMENTATION ASSOCIATED WITH DATA PROCESSING OF RAW DATA

BACKGROUND

Data processing may include the collection and manipulation of data to produce meaningful information. For example, data processing may translate collected data into usable information by performing one or more data processing operations or actions. Data processing may start with data in a raw form and may include converting the raw data into a more readable format, giving the data a form and a context necessary to be interpreted by devices (e.g., computers or servers) and utilized by users. Data processing may include the performance of analytics, data sorting, data visualization, and/or data cleansing, among other examples.

SUMMARY

Some implementations described herein relate to a system for providing computational notebooks and raw data that are searchable from a single source. The system may include one or more memories and one or more processors coupled to the one or more memories. The one or more processors may be configured to store a set of raw data in a first database, wherein the first database is associated with a first set of storage parameters, and wherein the first database is associated with a storage parameter, of the first set of storage parameters, that restricts access associated with adding or modifying information stored in the first database. The one or more processors may be configured to process a subset of data from the set of raw data, wherein processing the subset of data includes performing one or more data processing operations associated with the subset of data to obtain processed data, wherein the one or more data processing operations are performed via to computational notebook, wherein the computational notebook is written at least partially in a computer programming language, and wherein the computational notebook defines the one or more data processing operations. The one or more processors may be configured to store the computational notebook in a second database based on processing the subset of data using the computational notebook, wherein the second database is associated with a second set of storage parameters, and wherein the second database is associated with a variable storage duration for data stored in the second database. The one or more processors may be configured to provide the first database and the second database as data sources for a data searching application to enable the first database and the second database to be searchable via a single graphical user interface (GUI) associated with the data searching application.

Some implementations described herein relate to a method of providing data processing operation documentation and raw data that are searchable from a single source. The method may include storing, by a device, a set of data in a first database, wherein the first database is associated with a fixed storage duration for the set of data, and wherein the first database is associated with a storage parameter that restricts access associated with adding or modifying information stored in the first database. The method may include processing, by the device, a subset of data from the set of data, wherein processing the subset of data includes performing one or more data processing operations associated with the subset of data to obtain processed data, wherein processing the subset of data includes performing the one or more data processing operations performed via the data processing operation documentation, and wherein the data processing operation documentation defines the one or more data processing operations. The method may include storing, by the device, the data processing operation documentation in a second database based on processing the subset of data using the data processing operation documentation, wherein the second database is associated with a variable storage duration for data stored in the second database. The method may include providing, by the device, the first database and the second database as data sources for a data searching application to enable the first database and the second database to be searchable via a dashboard associated with the data searching application.

Some implementations described herein relate to a non-transitory computer-readable medium that stores a set of instructions for a device. The set of instructions, when executed by one or more processors of the device, may cause the device to store a set of data in a first database, wherein the first database is associated with a first set of storage parameters. The set of instructions, when executed by one or more processors of the device, may cause the device to process a subset of data from the set of data, wherein processing the subset of data includes performing one or more data processing operations associated with the subset of data to obtain processed data, wherein processing the subset of data includes performing the one or more data processing operations performed via data processing operation documentation, wherein the data processing operation documentation is written at least partially in executable code, and wherein the data processing operation documentation defines the one or more data processing operations. The set of instructions, when executed by one or more processors of the device, may cause the device to store the data processing operation documentation in a second database based on processing the subset of data using the data processing operation documentation, wherein the second database is associated with a second set of storage parameters, and at least one storage parameter is different from the first set of storage parameters and the second set of storage parameters. The set of instructions, when executed by one or more processors of the device, may cause the device to provide the first database and the second database as data sources to enable the first database and the second database to be searchable via a single GUI displayed on a client device.

DETAILED DESCRIPTION

Figure 1A:
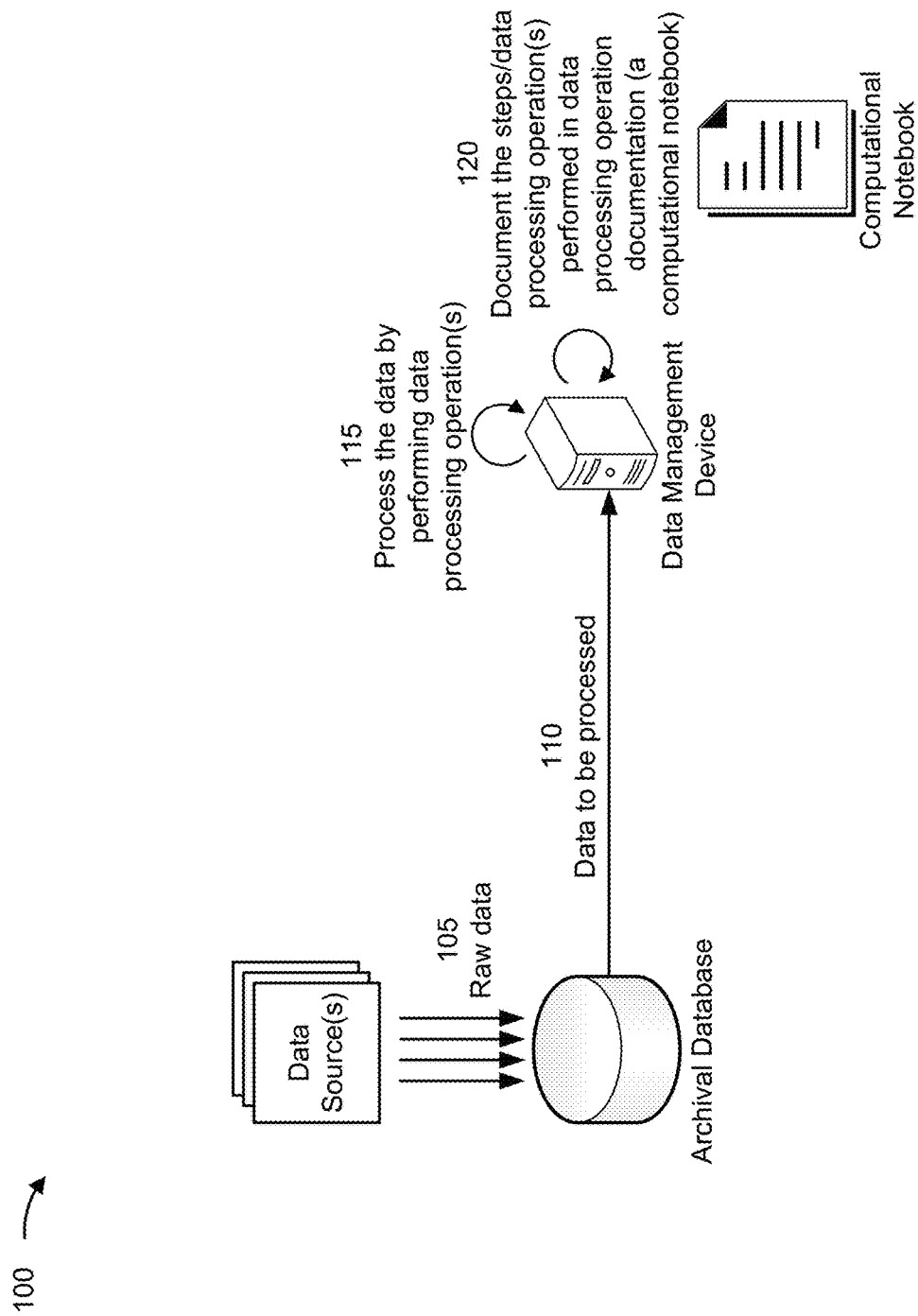
FIGS. 1A-1C are diagrams of an example implementation relating to providing searchable data processing operation documentation associated with data processing of raw data.

The following detailed description of example implementations refers to the accompanying drawings. The same reference numbers in different drawings may identify the same or similar elements.

An institution may generate hundreds, thousands, or millions of data points through different operations or applications executing on devices associated with the institution. The raw data (e.g., unprocessed data) generated by devices associated with the institution may be stored in an archival database. For example, the archival database may be a centralized database for storing raw data, such as a data lake or a data warehouse, among other examples. A user, such as a data analyst, may retrieve data from the archival database to perform data processing associated with the retrieved data, such as the performance of analytics, data sorting, data visualization, and/or data cleansing, among other examples. The data analyst may use documentation (e.g., data processing operation documentation), such as a computational notebook, to perform the data processing. For example, the documentation may include code (e.g., executable code) written in a computer programming language, such as a PYTHON computer programming language. The code, when executed by a device, may cause one or more data processing operations to be performed on the retrieved data. The documentation may record the steps and/or operations performed by the data analyst to perform the data processing on the retrieved data.

Therefore, the data processing operation documentation may be useful for ensuring the integrity and/or repeatability of performed data processing. For example, the data processing operation documentation may be used to verify steps or operations performed by a data analyst (e.g., thereby verifying the integrity of processed data produced by the data processing operation(s)) and/or may be used to repeat the steps or operations performed by a data analyst (e.g., thereby saving time resources of data analysts and processing resources of devices associated with the institution). However, data processing operation documentation may be stored locally on a device associated with the data analyst who performed the data processing. Therefore, it may be difficult to make the data processing operation documentation produced by one data analyst, using a device associated with the data analyst, available to multiple devices (or data analysts) associated with the institution. Moreover, the institution may be associated with multiple (e.g., tens or hundreds) of data analysts producing locally stored data processing operation documentation. Further, because the data processing operation documentation may be produced on different devices and may be stored in different locations, accessing the produced data processing operation documentation across an institution may be associated with a high complexity.

Additionally, the data processing operation documentation may be more useful in connection with the raw data associated with the performed data processing. However, the archival database that stores the raw data may have fixed storage durations and/or may restrict access for users to write data to the archival database. For example, because the archival database stores raw data produced by many devices or data sources associated with the institution, access to modify data in, or add data to, the archival database may be restricted to ensure the integrity of the raw data produced by devices associated with the institution. In other words, storage of the raw data and storage of the data processing operation documentation may be associated with different requirements, different durations, and/or different security parameters (e.g., user access parameters, and/or write access parameters, among other examples). As a result, making the data processing operation documentation produced on multiple devices available, in addition to the raw data stored in the archival database, may require multiple devices to transmit indications of different storage locations for data processing operation documentation. Additionally, to retrieve data processing operation documentation associated with the institution, a device may be required to retrieve different data processing operation documentation from different local storage locations and may be required to retrieve raw data from the archival database, thereby consuming additional resources (e.g., computing resources, processing resources, and/or power resources) and increasing a complexity associated with retrieving the data processing operation documentation in connection with the raw data.

Some techniques and apparatuses described herein enable searchable data processing operation documentation associated with data processing of raw data. For example, raw data may be stored in an archival database that is associated with a first set of storage parameters. Data, retrieved from the archival database, may be processed by performing one or more data processing operations. The one or more data processing operations may be recorded in data processing operation documentation, such as a computational notebook. The data processing operation documentation may be stored in a centralized database that is associated with a second set of storage parameters. The data processing operation documentation may be indexed to provide index values or index information to data processing operation documentation stored in the database. A system may provide the archival database and the database that stores the data processing operation documentation available as data sources to a single data searching application to enable the first database and the second database to be searchable via a single graphical user interface (GUI) (e.g., a single dashboard) associated with the data searching application.

As a result, by storing the raw data and the data processing operation documentation in different databases with different storage parameters, the system may enable the data processing operation documentation to be searchable in connection with the raw data. This may improve one or more benefits of accessing the data processing operation documentation because the data processing operation documentation may be more useful in the context of the raw data. Moreover, using separate databases enables the system to store the raw data and the data processing operation documentation in different manners. For example, the raw data may be stored with fixed durations (e.g., to comply with regulatory requirements) and with more restrictive access (e.g., write access or modification access may be restricted) and the data processing operation documentation may be stored for variable durations (e.g., irrelevant or old data processing operation documentation may be removed from the database at different times). Therefore, the system may balance the different storage requirements of raw data produced by devices associated with the institution and data processing operation documentation to enable the data processing operation documentation.

As a result, the raw data and the data processing operation documentation may be provided in a searchable manner using a single GUI or dashboard. This may improve access to the raw data and the data processing operation documentation. Moreover, this may improve the integrity, verifiability, and/or repeatability of data processing operations performed by data analysts associated with the institution. Additionally, this may conserve computing resources, processing resources, and/or time resources that would have otherwise been used to recreate the code or computational notebook used to perform data processing operations that was previously created by another device or another data analyst. By providing access to searchable raw data and searchable data processing operation documentation, a barrier for accessing and/or performing some data processing operations may be removed because the data processing operation documentation may be created at least partially using a computer programming language. Therefore, data analysts who are unable to read or write using the computer programming language may be enabled to access and/or execute the code or computational notebooks previously created using the computer programming language, thereby enabling the computer programming language to execute the code or the computational notebooks on raw data.

Figure 1B:
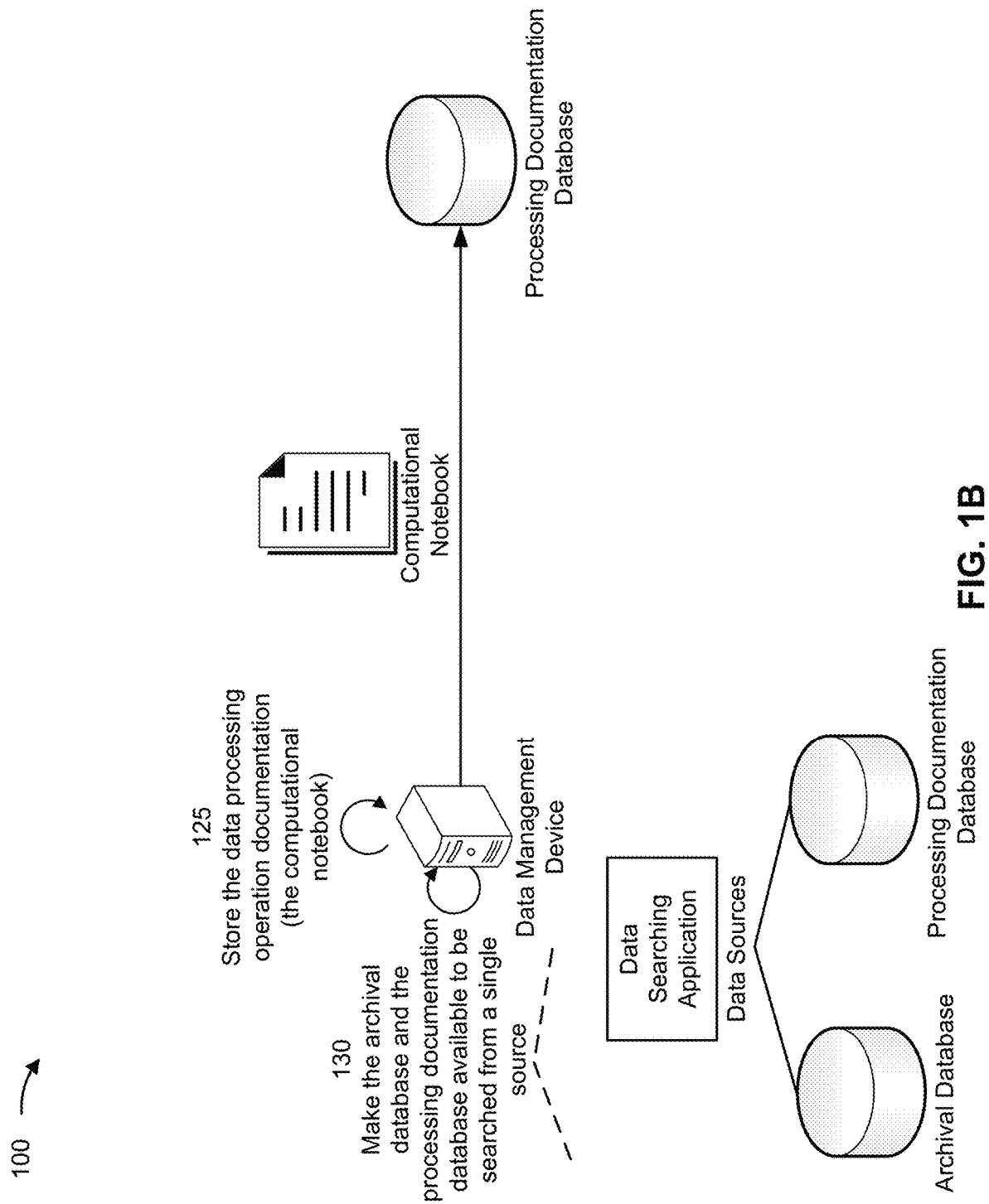
Figure 1C:
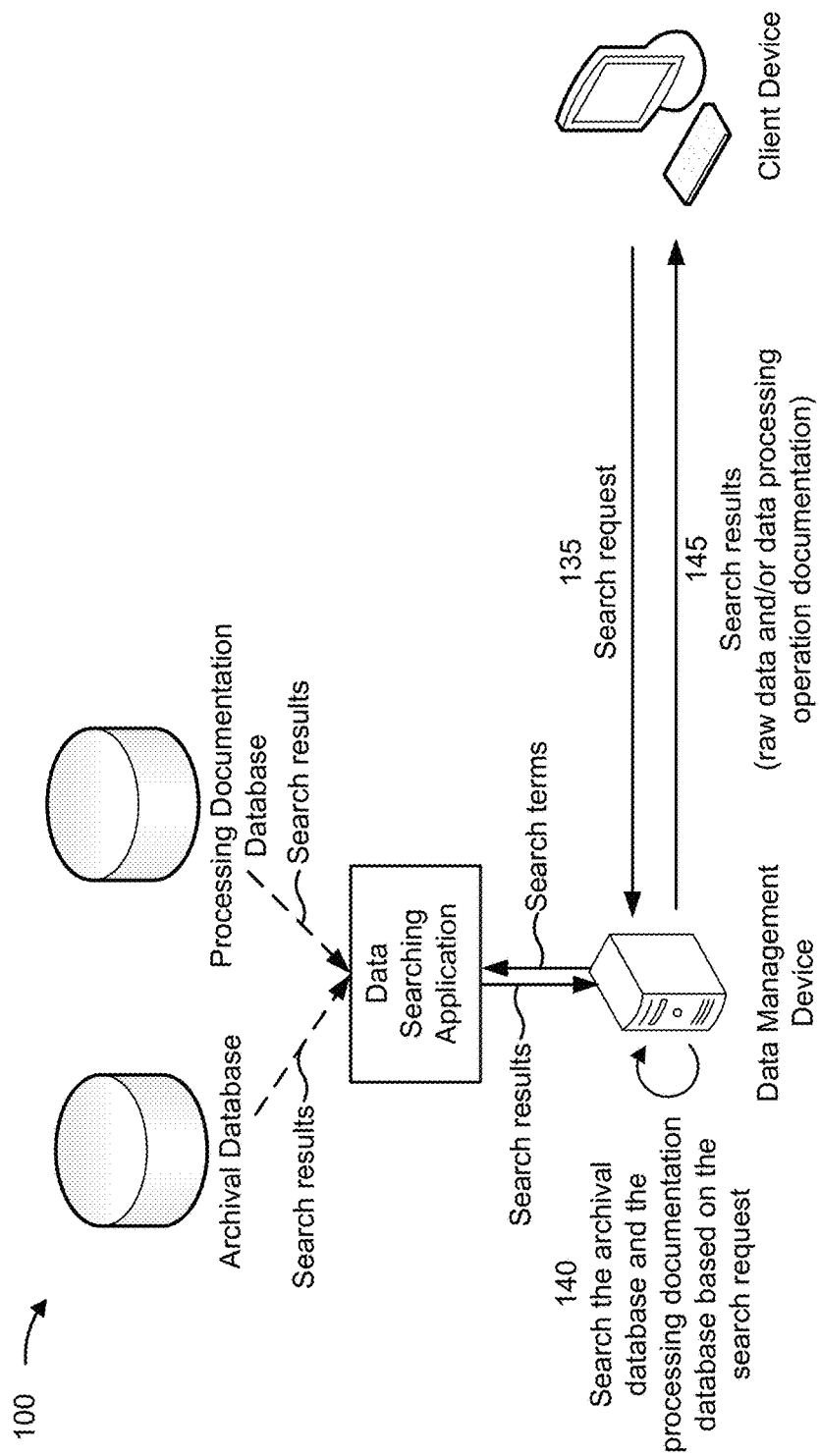

FIGS. 1A-1C are diagrams of an example 100 associated with providing searchable data processing operation documentation associated with data processing of raw data. As shown in FIGS. 1A-1C, example 100 includes a data management device, an archival database, a processing documentation database, and a client device. These devices are described in more detail in connection with FIGS. 2 and 3. The devices may communicate and/or interact to provide searchable data processing operation documentation associated with data processing of raw data, as described herein.

As shown in FIG. 1A, an institution (e.g., a company or a business) may generate data. As shown by reference number 105, one or more data sources may provide raw data to the archival database. "Raw data" may refer to data that has not been processed or modified from an original form. For example, applications executing on devices associated with the institution may generate raw data. The applications and/or the devices may store the generated data in the archival database. The archival database may be a data lake (e.g., system or repository of data stored in the data's natural or raw format) or a data warehouse (e.g., a system or central repository for storing raw data), among other examples. As shown in FIG. 1A, the archival database may receive raw data from multiple data sources associated with the institution.

The archival database may be associated with a first set of storage parameters. The first set of storage parameters may include one or more security parameters, one or more user access parameters, and/or a data retention parameter, among other examples. For example, the first set of storage parameters and/or the data retention parameter may indicate that the archival database is associated with a fixed storage duration. In other words, the archival database may store data for a fixed amount of time. The storage duration of the archival database may be fixed based on regulatory requirements (e.g., a regulatory agency may define, or otherwise fix, an amount of time for which the institution must keep generated data stored). In some implementations, the first set of storage parameters and/or a user access parameter may include a storage parameter that restricts access associated with adding or modifying information stored in the archival database. For example, the archival database may not allow write-back access for one or more (or any) users who retrieve data from the archival database (e.g., for data processing purposes). In other words, one or more (or all) users may be prevented from storing data or information in the archival database. In some implementations, only the one or more data sources may be permitted to write or store data in the archival database. Access for storing and/or modifying data in the archival database may be restricted to ensure that the integrity of the raw data associated with the institution is maintained (e.g., may ensure that data stored in the archival database is not modified, changed, or manipulated in any way).

As shown by reference number 110, the data management device may receive, from the archival database, a subset of data of a set of data stored by the archival database. For example, the data management device may receive the subset of data for data processing purposes. In some implementations, the data management device may receive, via a user input, search terms or a search request. The data management device may retrieve, from the archival database, the subset of data based on the search terms or the search request. In some implementations, the data management device may transmit, to the archival database or another device, a search request to cause the subset of data to be transmitted to the data management device. In some implementations, the data management device may receive the subset of data based on executing code included in data processing operation documentation (e.g., a computational notebook) associated with a data processing operation, as explained in more detail elsewhere herein. The subset of data may include data in a raw or unprocessed form. In some implementations, a user associated with retrieving the subset of data may not have write access (e.g., may not be permitted to store or add information to the archival database). For example, the raw data may be stored with a security storage parameter, of the first set of storage parameters, that indicates that one or more users, including a user associated with processing the subset of data, are permitted read only access to the first database. In other words, one or more users (e.g., data analysts) who perform data processing jobs associated with the raw data may not have permission or access to write, store, add, and/or modify information associated with the archival database (e.g., and may only be permitted to retrieve or receive information from the archival database).

As shown by reference number 115, the data management device may process the data (e.g., the subset of data) received from the archival database by performing one or more data processing operations. A data processing operation may include an operation to modify, manipulate, change, sort, and/or clean data to transform the data from a raw form to a processed form. For example, a data processing operation may include a join operation (e.g., to join two or more sets of data together), a merge operation (e.g., to merge two or more sets of data together), a concatenation operation, and/or an add operation (e.g., to add in data from another data source or database), among other examples. In some implementations, the data management device may perform the one or more data processing operations by executing code (e.g., a portion of data processing operation documentation that is written in a computer programming language) to cause the one or more data processing operations to be performed. For example, a portion (or all) of data processing operation documentation for a data processing job may be written in code, such as Python® code or code of another computer programming language. The code, when executed by the data management device, may cause the data management device to retrieve or receive the data from the archival database, retrieve or receive data from another data source or another database, and/or to perform the one or more data processing operations to process the data from a raw form to a processed form.

As shown by reference number 120, the steps or data processing operation(s) performed by the data management device may be documented or recorded in data processing operation documentation. The data processing operation documentation may include a computational notebook. A computational notebook may be referred to as an electronic notebook, a notebook interface, a modular notebook, and/or a virtual notebook environment. A computational notebook may be used for literate programming (e.g., a method of programming that includes an explanation of the programming logic using natural language). For example, a first portion of a computational notebook may be written in a computer programming language, such as Python®, and a second portion of the computational notebook may be written in natural language. The second portion may explain, in natural language, the logic or the steps performed by the first portion written in the computer programming language. For example, the first portion may include code that, when executed by the data management device, causes the data management device to perform the one or more data processing operations, as described above. An example of a computational notebook is a Jupyter® Notebook. In some implementations, the data processing operation documentation may include one or more computational notebooks. In some implementations, the data processing operation documentation may include other documentation, such as code, tables (e.g., that outline or document the steps or operations performed for a data processing job), and/or other documents that indicate the steps or operations performed for a data processing job.

Computational notebooks may include code, explanatory text, computations, images, metadata, and/or indications of raw data or processed data. Data analysts may use computational notebooks to plan, document, and/or perform data processing jobs. The computational notebooks may be generated locally on a device, such as the data management device, that is performing the data processing operations. As described elsewhere herein, computational notebooks or similar documentation may be generated for the particular user (e.g., data analyst) who is performing a data processing job. The computational notebooks may aid the data analyst in performing the data processing job (e.g., in performing the one or more data processing operations). The data processing operation documentation may be derivative work generated as part of performing a data processing job (e.g., as part of performing one or more data processing operations). For example, the data processing operation documentation may include code, computational notebooks, and/or other documentation created by a data analyst as part of performing data processing on a set of raw data. In some implementations, the data processing operation documentation may define one or more data processing operations performed as part of a data processing job.

The data processing operation documentation (e.g., the computational notebook) may indicate queries or searches (e.g., search terms or search requests) used to obtain the raw data (e.g., used to obtain the subset of data described above), the raw data that was processed, steps or operations performed to process the data (e.g., one or more data processing operations), and/or results (e.g., processed data) from the data processing job, among other examples. In some implementations, the processed data that is produced as a result of performing the one or more data processing operations may be stored by the data management device. For example, the processed data may be stored in a database (e.g., a cloud-based database). Alternatively, the processed data may be stored with the data processing operation documentation in the processing documentation database (e.g., described in more detail elsewhere herein). In some implementations, the data processing operation documentation (e.g., the computational notebook) may indicate a storage location of the processed data.

As shown in FIG. 1B, and by reference number 125, the data management device may store the data processing operation documentation in a second database (e.g., the processing documentation database). For example, as part of performing a data processing job (e.g., after completing the data processing job), the data management device may store the data processing operation documentation in the processing documentation database to make the data processing operation documentation available to other devices associated with the institution (e.g., the second database may be a cloud-based database or another database that is accessible by other devices associated with the institution). The data management device may store one or more computational notebooks and/or other documentation that outlines or indicates the data processing operations or steps performed as part of a data processing job. In some implementations, the data management device may store the processed data (e.g., produced as a result of performing the one or more data processing operations) in the processing documentation database. Alternatively, the data management device may store the processed data (e.g., produced as a result of performing the one or more data processing operations) in a separate database.

The second database (e.g., the processing documentation database) may be associated with a second set of storage parameters. The second set of storage parameters may be different than the first set of storage parameters (e.g., that are associated with the archival database). For example, the processing documentation database may be associated with a variable storage duration for data stored in the processing documentation database (e.g., whereas the archival database is associated with a fixed storage duration). In other words, different data stored in the processing documentation database may be stored for different amounts of time (e.g., before being removed from the processing documentation database). For example, a first data processing operation documentation stored in the processing documentation database may be stored for a first amount of time and a second data processing operation documentation stored in the processing documentation database may be stored for a second amount of time. The variable storage duration may provide additional flexibility to enable the data management device (and/or another device) to remove irrelevant or old data processing operation documentation from the processing documentation database and/or to store important or frequently used (e.g., frequently searched for or frequently retrieved) data processing operation documentation in the processing documentation database for a longer duration. Moreover, the variable storage duration may conserve memory resources or storage resources by enabling the irrelevant or old data processing operation documentation to be removed from the processing documentation database.

In some implementations, the archival database may be associated with more restrictive user access than the processing documentation database. For example, the archival database may be associated with a first user access parameter and the processing documentation database may be associated with a second user access parameter. The first user access parameter may indicate more restrictive user access than the second user access parameter. For example, the archival database may restrict write-access (e.g., may restrict permission for users who have access to store or add information to the archival database) more than a write-access that is associated with the processing documentation database. For example, a data analyst who performs data processing jobs by retrieving raw data from the archival database may not have access to add or write information to the archival database. However, the data analyst may have permission to add or write information to the processing documentation database. As a result, an integrity of the raw data may be maintained (e.g., by the more restrictive user access parameter) and derivative work associated with data processing jobs associated with the raw data (e.g., data processing operation documentation) may be stored by the data management device.

As described above, the archival database and the processing documentation database may have different storage parameters or storage requirements. For example, the archival database may be an archive that receives raw data from data sources associated with the institution and that stores the raw data in a manner that preserves the form and integrity of the raw data (e.g., to ensure that regulatory requirements are complied with and to ensure that the raw data is not manipulated or changed). In other words, the archival database may be a static database that receives raw data and that preserves the raw data in the received form for a fixed duration. In contrast, the processing documentation database may be a more flexible or dynamic database that enables more users or devices to add or write information to the processing documentation database. The processing documentation database may be a more fluid or dynamic database that enables different information to be stored for different amounts of time. As a result, the raw data may be preserved in an unprocessed form (e.g., in the archival database) and derivative work (e.g., data processing operation documentation) associated with data processing jobs performed on a subset of the raw data may be stored in a more flexible and dynamic manner in the processing documentation database. This may enable the data management device to balance the need with preserving the integrity of the raw data while also enabling the data processing operation documentation to be stored in a searchable manner.

In some implementations, the data processing operation documentation stored in the processing documentation database may be indexed. For example, the data management device (and/or another device) may generate an index value for the data processing operation documentation to enable the data processing operation documentation to be searchable in the processing documentation database via a data searching application or via a search request. For example, as part of storing the data processing operation documentation (e.g., a computational notebook), the data processing operation documentation may be indexed to reduce complexity and processing resources associated with searching the processing documentation database for the data processing operation documentation. In some implementations, an extract, transform, and load (ETL) operation may be performed to store and index the data processing operation documentation in a single, searchable, central repository (e.g., the processing documentation database). For example, the ETL operation may include collecting data processing operation documentation, cataloging or indexing the data processing operation documentation, storing metadata associated with the data processing operation documentation, and storing the indexed or cataloged data processing operation documentation in the data processing operation documentation. In some implementations, the ETL operation may be associated with a service provided by a third party.

As shown by reference number 130, the data management device may make the archival database and the processing documentation database available to be searched from a single source. For example, as shown in FIG. 1B, the data management device may provide the archival database and the processing documentation database as data sources for a data searching application (e.g., an application that, when executed on a device, enables one or more databases to be searched via the application). This may enable the archival database and the processing documentation database to be searchable via a single GUI (e.g., a single dashboard) associated with the data searching application. For example, the data searching application may provide, for display on a device (e.g., the client device, depicted in FIG. 1C), the GUI or the dashboard. Because the archival database and the processing documentation database are provided as data sources for the data searching application, a user of the client device may be enabled to input search terms to search both the archival database and the processing documentation database from a single source (e.g., the data searching application or the GUI/dashboard).

As a result, raw data that is preserved in an archive (e.g., the archival database) and derivative work (e.g., data processing operation documentation and/or computational notebooks) that was generated as part of data processing jobs associated with the raw data may both be searchable from the same source. This may improve access to the raw data and the data processing operation documentation and/or computational notebooks because the data processing operation documentation and/or computational notebooks may be more useful in the context of the raw data. For example, a search for raw data may return a subset of raw data and may also return data processing operation documentation and/or computational notebooks that were used to process the subset of raw data, providing additional insight and context for the subset of raw data. Additionally, by providing the raw data and the derivative work as data sources in separate databases, an integrity of the raw data may be maintained and the derivative work may be stored in a more dynamic and flexible manner.

As shown in FIG. 1C, the client device may search for information stored in the archival database and/or the processing documentation database. As shown by reference number 135, the client device may transmit, and the data management device may receive, a search request indicating one or more search terms. In some implementations, the search request may be transmitted via the data searching application and/or the GUI/dashboard. For example, the client device may receive, via the GUI/dashboard, a user input indicating the search terms. In some implementations, a user input may indicate searches that are to be repeatedly performed (e.g., to enable alerts to be provided to the client device when search results meet an alert criteria). Although FIG. 1C depicts the client device transmitting the search request to the data management device, in some implementations the client device may provide the search request directly to the data searching application (e.g., that is executing on the client device) and the data searching application may search the archival database and the processing documentation database based on the search request, in a similar manner as described elsewhere herein. In such examples, the data searching application may provide the search results directly to the client device (e.g., rather than to the data management device).

As shown by reference number 140, the data management device may search or parse, via the data searching application, the archival database and the processing documentation database based on the search request. For example, the data management device and/or the data searching application may search the archival database and the processing documentation database based on search terms indicated by the search request to identify search results. As described above, the data processing operation documentation may be searchable based on the indexing of the data processing operation documentation.

For example, a search request may indicate search terms to search for raw data from the archival database. In some implementations, the data management device and/or the data searching application may search the archival database for raw data based on the search terms. Additionally, the data management device and/or the data searching application may search the processing documentation database for data processing operation documentation based on the search terms. For example, the data management device and/or the data searching application may search for data processing operation documentation that is associated with the same (or similar) raw data as raw data that is retrieved based on the search request (e.g., may search for data processing operation documentation that was previously used to perform a data processing job on the same, or similar, raw data that is associated with the search request). In some implementations, the data management device and/or the data searching application may search for data processing operation documentation that indicates the same (or similar) search terms as the search terms indicated by the search request. For example, data processing operation documentation may indicate queries or searches used to obtain raw data for a data processing job. The data management device and/or the data searching application may search data processing operation documentation that indicates similar queries or searches as the search request transmitted by the client device. This may enable the data management device and/or the data searching application to identify data processing operation documentation (e.g., computational notebooks) that is relevant to the search request and/or relevant to raw data retrieved based on the search request.

As shown in FIG. 1C, the data management device and/or the data searching application may receive search results based on searching the archival database and the processing documentation database. The search results may include a subset of raw data and/or one or more pieces of data processing operation documentation. In some implementations, the search results may include both raw data and data processing operation documentation.

As shown by reference number 145, the data management device and/or the data searching application may transmit, and the client device may receive, the search results obtained based on the search request. As described above, the search results may include a subset of raw data and/or one or more pieces of data processing operation documentation (e.g., one or more computational notebooks). The search results may be displayed (e.g., via the GUI/dashboard) by the client device. As a result, the subset of raw data may be processed and/or analyzed (e.g., in a similar manner as described elsewhere herein). Additionally, data processing jobs that have been completed or data processing operations may be analyzed to provide additional insight on steps or operations to be performed to process the subset of data. For example, the data processing operation documentation may indicate steps or operations performed for a previous data processing job. As a result, a user of the client device may be enabled to receive the data processing operation documentation, analyze the data processing operation documentation, and repeat or verify the steps or operations performed as part of the previous data processing job. This may improve a legitimacy or verifiability of the previous data processing job (e.g., because the steps or operations used to produce processed data as part of the previous data processing job may be searched for and analyzed at a later time). Additionally, this may conserve time and/or processing resources that would have otherwise been used to generate or create code or other documentation to perform the same, or similar, data processing operations as indicated via the data processing operation documentation (e.g., the steps or operations used to produce processed data as part of the previous data processing job may be easily repeated by executing code or following the procedures indicated by the data processing operation documentation).

In some implementations, the client device, the data management device, and/or another device may cause code (e.g., a portion of the data processing operation documentation that is written in a computer programming language) of data processing operation documentation that is included in the search results to be automatically executed to cause the one or more data processing operations to be performed. For example, the search results may include a subset of raw data and a computational notebook. The computational notebook may include code (e.g., information written in a computer programming language) that was previously created to perform data processing operations as part of a previous data processing job. The client device, the data management device, and/or another device may automatically execute the code to cause the data processing operations to be performed on the subset of raw data that is included in the search results. In some implementations, automatically executing the code may cause a search of the archival database to be performed to retrieve additional or different raw data from the archival database. Automatically executing the code may cause the data processing operations to be performed on the subset of raw data that is included in the search results and/or on raw data that is retrieved based on executing the code. As a result, processing resources and/or computing resources that would have otherwise been used to search for the raw data, generate code or other documentation to perform data processing operations, and to perform the data processing operations may be conserved. Moreover, users who are unable to generate code may be enabled to perform the data processing operations based on searching for, obtaining, and/or executing code contained in the data processing operation documentation (e.g., in the computational notebook).

In some implementations, a search may be configured (e.g., on the client device, the data management device, and/or the data searching application) to be repeated one or more times. For example, new data may be added to the archival database over time (e.g., from the one or more data sources). Therefore, a search with the same search terms may be repeated to evaluate search results over time as new data is added to the archival database from the data source(s). Similarly, one or more data processing operation(s) may be configured to be repeated on the search results. For example, data processing operation documentation may be obtained in connection with the repeated search requests (e.g., from the processing documentation database). The client device, the data management device, and/or another device may execute code included in the data processing operation documentation to cause one or more data processing operations to be performed on raw data included in the search results. This operation may be repeated over time such that the one or more data processing operations are automatically performed on the raw data obtained based on the repeated search requests. This conserves time, processing resources, and/or computing resources that would have otherwise been used to search for the raw data, generate code or other documentation to perform data processing operations, and to perform the data processing operations. Additionally, this reduces a complexity associated with data processing operations that are repeated over time as new data is added to the archival database.

As a result, raw data and derivative work associated with data processing jobs associated with the raw data may be provided in a searchable manner from a single source or a single dashboard while maintaining the different storage parameters and storage requirements associated with the raw data and the derivative work. For example, the raw data may be stored in an archive with strict access parameters that limit users who are permitted to add or modify data in the archive (e.g., to ensure that the integrity of the raw data is maintained) while the derivative work may be stored in a more dynamic or flexible manner. Providing the raw data and the derivate work in a searchable manner from a single source may conserve time, processing resources, and/or computing resources associated with performing data processing jobs or searches associated with the raw data.

As indicated above, FIGS. 1A-1C are provided as an example. Other examples may differ from what is described with regard to FIGS. 1A-1C.

Figure 2:
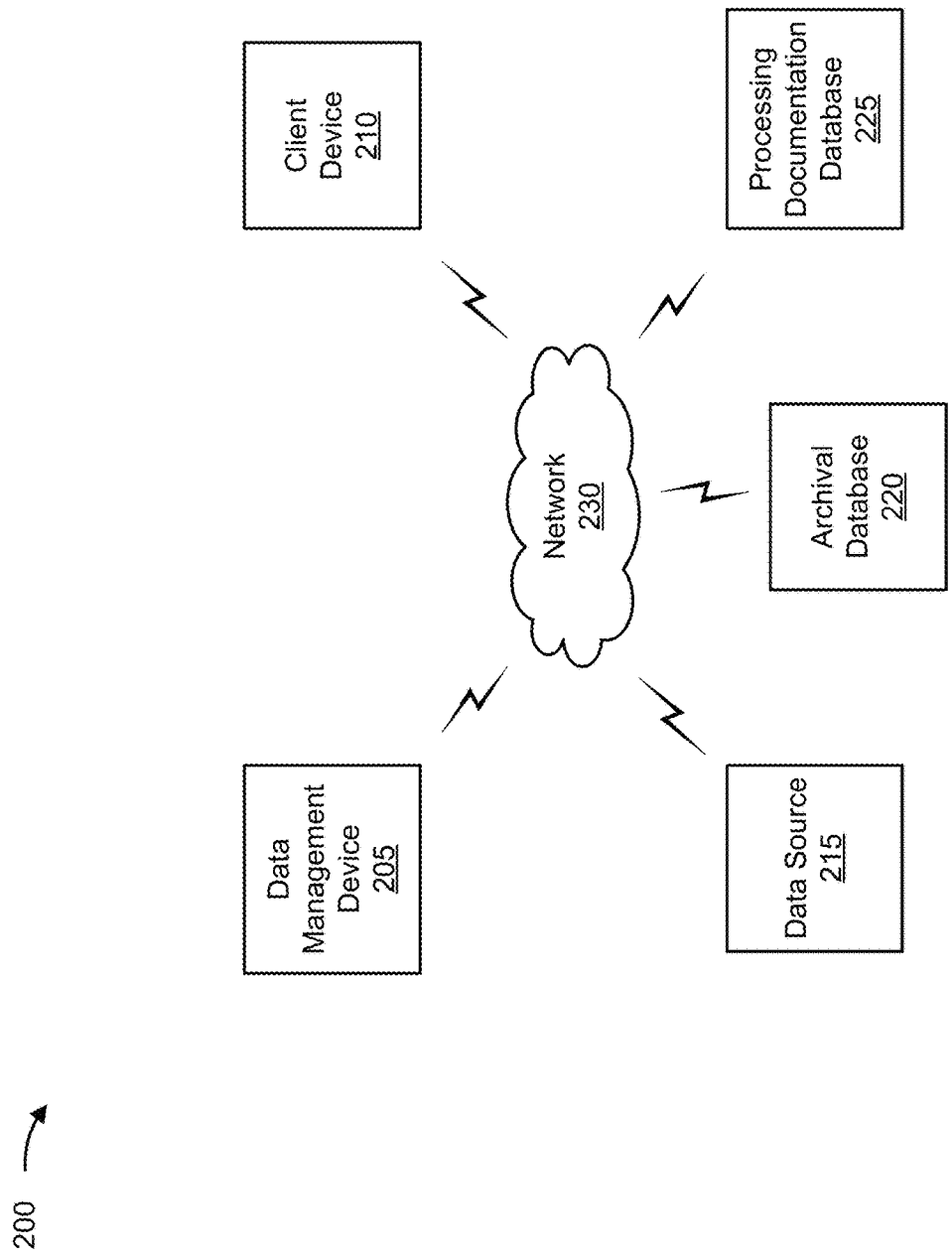
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a data management device 205, a client device 210, a data source 215, an archival database 220, a processing documentation database 225, and a network 230. Devices of environment 200 may interconnect via wired connections, wireless connections, or a combination of wired and wireless connections.

The data management device 205 includes one or more devices capable of receiving, generating, storing, processing, providing, and/or routing information associated with providing searchable data processing operation documentation associated with data processing of raw data, as described elsewhere herein. The data management device 205 may include a communication device and/or a computing device. For example, the data management device 205 may include a server, such as an application server, a client server, a web server, a database server, a host server, a proxy server, a virtual server (e.g., executing on computing hardware), or a server in a cloud computing system. In some implementations, the data management device 205 includes computing hardware used in a cloud computing environment.

The client device 210 includes one or more devices capable of receiving, generating, storing, processing, and/or providing information associated with providing searchable data processing operation documentation associated with data processing of raw data, as described elsewhere herein. The client device 210 may include a communication device and/or a computing device. For example, the client device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The data source 215 includes one or more devices capable of receiving, generating, storing, processing, and/or providing information associated with providing searchable data processing operation documentation associated with data processing of raw data, as described elsewhere herein. For example, one or more data sources 215 may provide raw data to the archival database 220 and/or the data management device 205. A data source 215 may include a communication device and/or a computing device. For example, a data source 215 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 215 may communicate with one or more other devices of environment 200, as described elsewhere herein.

The archival database 220 includes one or more devices capable of receiving, generating, storing, processing, and/or providing information associated with providing searchable data processing operation documentation associated with data processing of raw data, as described elsewhere herein. For example, the archival database 220 may store raw data and may provide the raw data to the data management device 205 and/or the client device 210. The archival database 220 may include a communication device and/or a computing device. For example, the archival database 220 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The archival database 220 may communicate with one or more other devices of environment 200, as described elsewhere herein.

The processing documentation database 225 includes one or more devices capable of receiving, generating, storing, processing, and/or providing information associated with providing searchable data processing operation documentation associated with data processing of raw data, as described elsewhere herein. For example, the processing documentation database 225 may store data processing operation documentation and may provide the data processing operation documentation to the data management device 205 and/or the client device 210. The processing documentation database 225 may include a communication device and/or a computing device. For example, the processing documentation database 225 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The processing documentation database 225 may communicate with one or more other devices of environment 200, as described elsewhere herein.

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
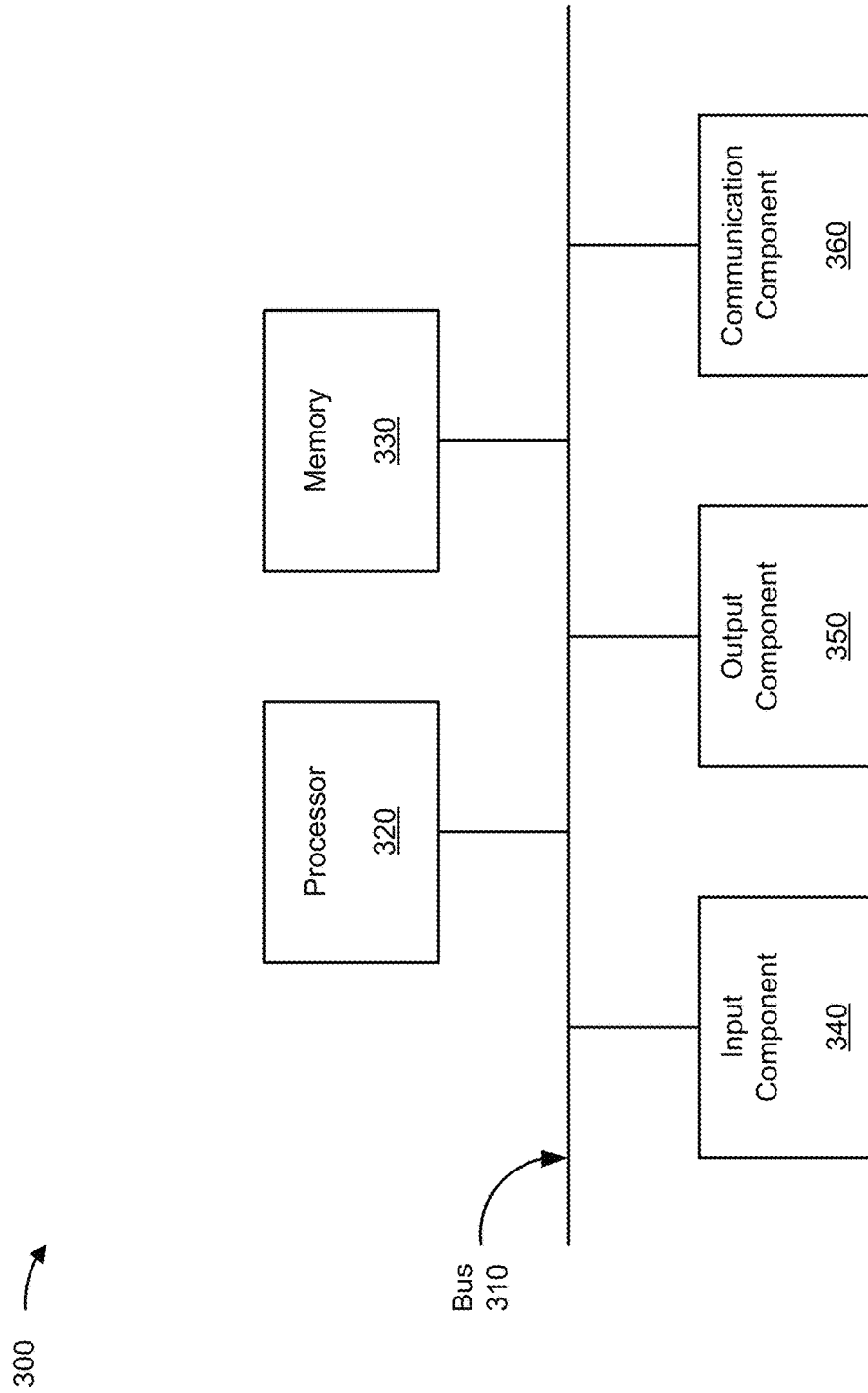
FIG. 3 is a diagram of example components of one or more devices of FIG. 2.

FIG. 3 is a diagram of example components of a device 300, which may correspond to the data management device 205, the client device 210, the data source 215, the archival database 220, and/or the processing documentation database 225. In some implementations, the data management device 205, the client device 210, the data source 215, the archival database 220, and/or the processing documentation database 225 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
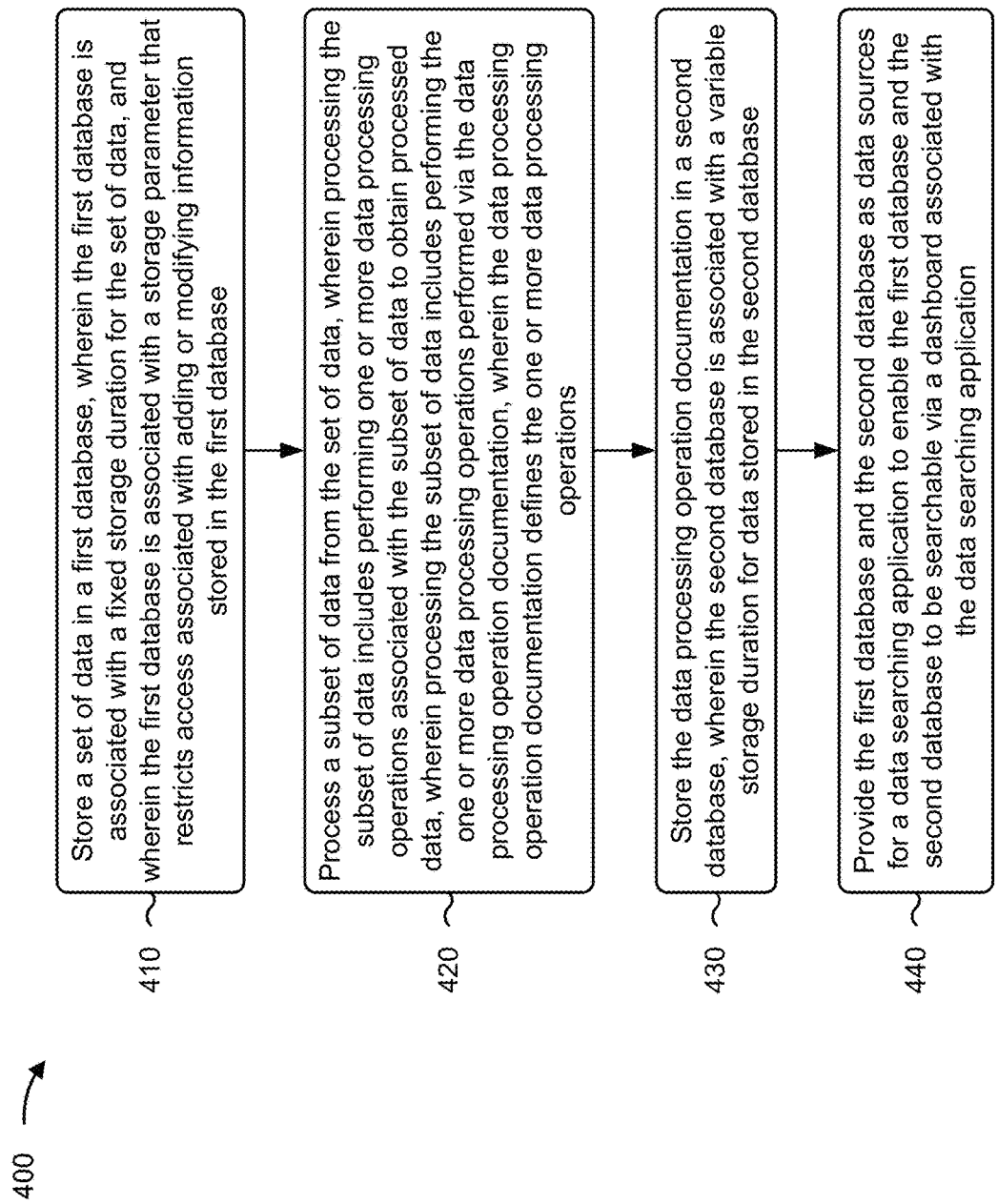
FIG. 4 is a flowchart of an example process relating to providing searchable data processing operation documentation associated with data processing of raw data.

FIG. 4 is a flowchart of an example process 400 associated with providing searchable data processing operation documentation associated with data processing of raw data. In some implementations, one or more process blocks of FIG. 4 may be performed by a device (e.g., the data management device 205). In some implementations, one or more process blocks of FIG. 4 may be performed by another device or a group of devices separate from or including the device, such as the client device 210, the data source(s) 215, the archival database 220, and/or the processing documentation database 225. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include storing a set of data in a first database (block 410). In some implementations, the first database is associated with a fixed storage duration for the set of data. In some implementations, the first database is associated with a storage parameter that restricts access associated with adding or modifying information stored in the first database. As further shown in FIG. 4, process 400 may include processing a subset of data from the set of data (block 420). In some implementations, processing the subset of data includes performing one or more data processing operations associated with the subset of data to obtain processed data. In some implementations, processing the subset of data includes performing the one or more data processing operations performed via the data processing operation documentation. In some implementations, the data processing operation documentation defines the one or more data processing operations.

As further shown in FIG. 4, process 400 may include storing the data processing operation documentation in a second database (block 430). In some implementations, the data processing operation documentation may be stored based on processing the subset of data using the data processing operation documentation. In some implementations, the second database is associated with a variable storage duration for data stored in the second database. As further shown in FIG. 4, process 400 may include providing the first database and the second database as data sources for a data searching application to enable the first database and the second database to be searchable via a dashboard associated with the data searching application (block 440).

In some implementations, process 400 may include executing a portion of the data processing operation documentation that is written in the computer programming language to cause the one or more data processing operations to be performed. In some implementations, search results may include the data processing operation documentations, and process 400 may include causing a portion of the data processing operation documentation that is written in the computer programming language to be automatically executed to cause the one or more data processing operations to be performed on the subset of data or another subset of data from the raw data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
one or more memories; and
one or more processors, coupled to the one or more memories, configured to:
store a set of raw data in a first database associated with a first set of storage parameters including a storage parameter, that restricts access associated with adding or modifying data stored in the first database, and a fixed storage duration for the data stored in the first database;
store a computational notebook, associated with a first data processing job, in a second database associated with a second set of storage parameters including a variable storage duration for data stored in the second database, wherein the computational notebook comprises a first portion, written in a computer programming language, that causes a performance of one or more data processing operations associated with a subset of the set of raw data, and wherein the second database stores a plurality of computational notebooks including the computational notebook;
enable the first database and the second database to be searchable via a single graphical user interface (GUI) associated with a data searching application;
receive, based on enabling the first database and the second database to be searchable and from the single GUI, a search request associated with a second data processing job;
identify, based on the search request, the subset of the set of raw data in the first database;
identify, based on the search request, the computational notebook from the plurality of computational notebooks stored in the second database;
automatically execute, based on identifying the computational notebook, the computer programming language to cause the one or more data processing operations to be performed on the subset of the set of raw data to derive processed data; and
transmit, to the single GUI, at least a portion of each of: the subset of the set of raw data, and the processed data.

2. The system of claim 1, wherein the computational notebook further comprises a second portion explaining, in natural logic, logic or steps of the first portion.

3. The system of claim 1, wherein the first set of storage parameters further includes a security storage parameter that indicates that one or more users, including a user associated with the search request, are permitted read only access to the first database.

4. The system of claim 1, wherein the one or more processors are further configured to:
generate an index value for the computational notebook.

5. The system of claim 1, wherein the first set of storage parameters or the second set of storage parameters includes at least two of:
one or more security parameters,
one or more user access parameters, or
a data retention parameter.

6. The system of claim 1, wherein the computational notebook indicates at least two of:
the one or more data processing operations,
the search request,
the subset of the set of the raw data, or
a storage location of the processed data.

7. A method, comprising:
  storing, by a device, a set of raw data in a first database associated with a fixed storage duration, for data stored in the first database, and a storage parameter that restricts access associated with adding or modifying the data stored in the first database;
  performing one or more data processing operations, associated with a subset of the set of raw data and further associated with a first data processing job, to obtain processed data based on the subset of the set of raw data;
  storing, by the device, the one or more data processing operations in a second database associated with a variable storage duration for data stored in the second database, wherein the second database stores a plurality of computational notebooks including the computational notebook;
  enabling, by the device, the first database and the second database to be searchable via a single dashboard associated with a data searching application;
  receiving, based on enabling the first database and the second database to be searchable and from the single dashboard, a search request associated with a second data processing job;
  identifying, based on the search request, the subset of the set of raw data in the first database;
  identifying, based on the search request, the one or more data processing operations from the plurality of processing operations stored in the second database;
  automatically executing, based on identifying the computational notebook, a computer programming language to cause the one or more data processing operations to be performed on the subset of the set of raw data to derive processed data; and
  transmitting, to the single dashboard, at least a portion of each of: the subset of the set of raw data, and the processed data.

8. The method of claim 7, further comprising:
  generating data processing operation documentation based on performing the one or more data processing operations.

9. The method of claim 8, wherein the data processing operation documentation comprises a computational notebook comprising the one or more data processing operations.

10. The method of claim 7, wherein a user associated with processing the subset of the set of the raw data is restricted from adding or modifying the data stored in the first database.

11. The method of claim 8, wherein the data processing operation documentation is stored in the second database.

12. The method of claim 8, wherein the data processing operation documentation indicates at least two of:
  the one or more data processing operations,
  the search request,
  the subset of the set of raw data,
  the processed data, or
  a storage location of the processed data.

13. A non-transitory computer-readable medium storing a set of instructions, the set of instructions comprising:
  one or more instructions that, when executed by one or more processors of a device, cause the device to:
    store a set of data in a first database, wherein the first database is associated with a first set of storage parameters including a storage parameter, that restricts access associated with adding or modifying data stored in the first database, and a fixed storage duration for the data stored in the first database;
    perform one or more data processing operations, associated with a subset of data and further associated with a first data processing job, to obtain processed data based on the subset of the set of raw data;
    store the one or more data processing operations in a second database associated with a second set of storage parameters including a variable storage duration for data stored in the second database;
    enable the first database and the second database to be searchable via a single graphical user interface (GUI) displayed on a client device;
    receive, based on enabling the first database and the second database to be searchable and from the single GUI, a search request associated with a second data processing job;
    identify, based on the search request, the subset of the set of raw data in the first database;
    identify, based on the search request, the one or more data processing operations of a plurality of processing operations in the second database;
    automatically execute, based on identifying a computational notebook, the computer programming language to cause the one or more data processing operations to be performed on the subset of the set of raw data to derive processed data; and
    transmit, to the single GUI and based on searching the first database and the second database, at least a portion of each of: the subset of the set of raw data, and the processed data.

14. The non-transitory computer-readable medium of claim 13, wherein the first set of storage includes a first user access parameter for adding or modifying the data stored in the first database, and
  wherein the second set of storage parameters is associated with a second user access parameter for adding or modifying the data stored in the second database, wherein the first user access parameter indicates more restrictive user access than the second user access parameter.

15. The non-transitory computer-readable medium of claim 13, wherein the one or more instructions, that cause the device to process the subset of data, cause the device to:
  generate data processing operation documentation based on performing the one or more data processing operations.

16. The non-transitory computer-readable medium of claim 15, wherein the one or more instructions, when executed by the one or more processors, further cause the device to:
  generate an index value for the data processing operation documentation to enable the data processing operation documentation to be searchable in the second database.

17. The non-transitory computer-readable medium of claim 15, wherein the data processing operation documentation indicates at least two of:
  the one or more data processing operations,
  the search request,
  the subset of the set of raw data,
  the processed data, or
  a storage location of the processed data.

18. The system of claim 1, wherein the one or more processors are further configured to:
  generate the at least the first portion of the computational notebook based on performing the one or more data processing operations.

19. The system of claim 18, wherein the one or more data processing operations further relate to at least one of modifying, manipulating, changing, sorting, or cleaning the subset of the set of raw data to transform the subset of the set of raw data to the processed data.

\* \* \* \* \*